March 29, 1966 J. S. CUBERT ETAL 3,243,603

LOGIC CIRCUIT

Filed Nov. 14, 1962

INVENTOR
JACK SAUL CUBERT
THOMAS M. Lo CASALE

BY J. Donald Weber, Jr.
AGENT

United States Patent Office 3,243,603
Patented Mar. 29, 1966

3,243,603
LOGIC CIRCUIT

Jack Saul Cubert, Willow Grove, and Thomas M. Lo Casale, Warminster, Pa., assignors to Sperry Rand Corporation, New York, N.Y., a corporation of Delaware Filed Nov. 14, 1962, Ser. No. 237,494
5 Claims. (Cl. 307—88.5)

This invention relates to a circuit for performing a logic function. In particular, the instant circuit operates in accordance with NOR logic operation.

The subject circuit is adaptable for use as a building block network in an overall system operable with a business machine, as for example a digital computer. This adaptability of utilization and operation is valuable in the rapidly expanding business machine field. As is well known, business machines such as are available, as well as those planned and proposed, depend upon the operation therein of a plurality of circuits many of which are capable of performing a logic function. One of the desirable logic functions is the NOR operation, which is, effectively, a NOT-OR function. Inasmuch as the NOR function is desirable, the instant circuit which performs this operation, becomes highly valuable.

The instant circuit is adapted to perform in response to either pulse or level type signals. Thus, the input signals applied to the circuit do not delimit the operation thereof. Moreover, the circuit operates on the principle that a steady-state current is or is not produced in one winding of a transformer according to the magnitude of the input signal. A sampling signal, for example, a clock pulse, interrupts the steady-state current if it is present, in order to create a magnetic flux in another transformer winding which is inductively coupled to the first named winding. The magnetic flux created is sufficient to produce a potential difference across, and, therefore, a current through the inductively coupled transformer winding. The current produced is of the polarity, such that a tunnel diode connected to the second named winding is switched from one operating condition to another. The output is detected at the tunnel diode. Appropriate circuitry is provided for resetting the tunnel diode to the original operating condition.

It should be clear that an object of this invention is to provide a reproducible logic circuit.

Another object of this invention is to provide a logic circuit which may be utilized as a building block in logic systems.

Another object of this invention is to provide a circuit which performs a NOR logic operation.

Another object of this invention is to provide a logic circuit having a non-destructive sensing capability.

Another object of this invention is to provide a transformer coupled tunnel diode circuit having greater fan-in and fan-out properties.

Another object of the invention is to provide a transformer coupled logic circuit which permits better definition of the current which is selectively switched in the coupling transformer.

These and other objects and advantages will become more readily apparent when the following detailed description of the circuit is read in conjunction with the attached drawings, in which.

Figure 1:
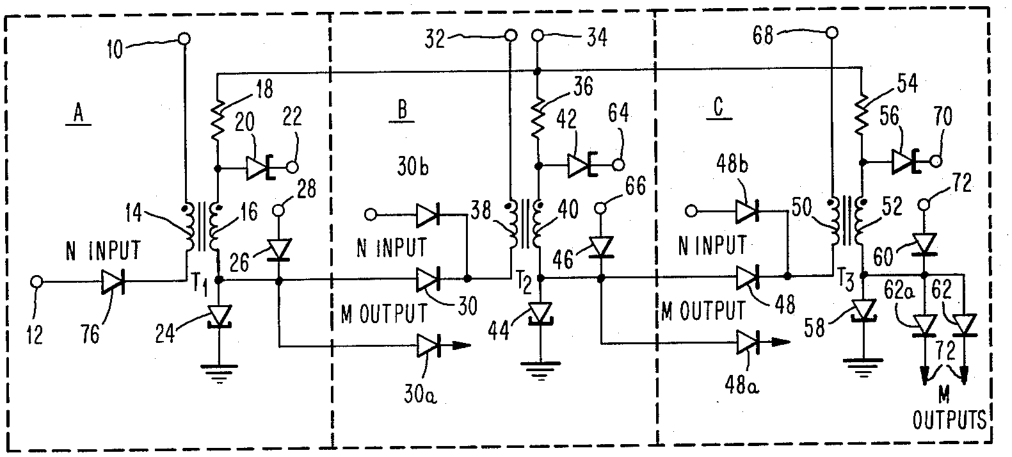
FIGURE 1 is a schematic diagram of the subject circuit.

Referring now to FIGURE 1, there is shown a system incorporating the subject circuit. The complete circuit is shown in the dashed outline labeled B. The circuits or circuit portions enclosed by the dashed outlines labeled A and C, respectively, represent input and output circuits which may be connected to the circuit enclosed in the aforesaid dashed outline B. It will be seen that the circuit portions shown in the outlines A and C are identical to portions of the circuit enclosed within the dashed outline B. It is to be understood of course, that this type of system, viz. incorporating a plurality of similar circuits in cascade need not be employed, but rather the input and output circuits represented by the circuit portions within the outlines A and C, respectively, may be any desired type of input or output circuit. However, for convenience, the input and output circuits are shown as being similar to portions of the circuit shown in outline B.

Furthermore, the circuit portions operate similarly to the counter-part circuit portions which will be described subsequently. In particular, the input circuit (which may be the output circuit of a previous stage) comprises a potential source 10. This potential source may be any conventional source capable of supplying a pulsating or recurring signal and may be defined for convenience as a sampling, sensing or clock pulse source. Typically the signal may have a base potential of zero volts, or ground potential, and a peak value of about +5 volts for the signal pulse. The source 10 is connected to one terminal of the primary winding 14 of the transformer T1. Typically, transformer T1 will be a step down transformer having a turns ratio of 3:1 such that current amplification is effected in the secondary winding thereof. Another terminal of winding 14 is connected to an input terminal 12 via coupling diode 76. Input terminal 12 may represent any desired input circuit capable of supplying either pulse or level type signals.

The secondary winding 16 of transformer T1 has one terminal thereof connected via resistor 18 (about 1000–1500 ohms) to potential source 34. Potential source 34 may be any conventional type of potential source which is capable of supplying a substantially constant potential of about +10 volts, as for example a battery. The potential source 34 and resistor 18 are connected together as a substantially constant-current source to provide a bias current of about 6 to 8 milliamperes which is applied to tunnel diode 24. The values of the resistor and the potential are primarily dictated by the type of tunnel diode 24 utilized and the peak current rating thereof. The tunnel diode, which has the anode thereof connected to another terminal of winding 16 and the cathode thereof connected to ground, may typically be an RCA type 1N3128 tunnel diode which has a peak current rating of about 10 milliamperes. A backward diode 20, typically a General Electric ZJ721 type component which may be considered to be a tunnel diode inserted in a backward polarity, is connected between the first terminal of winding 16 and potential source 22. The source 22, which may be any conventional source capable of supplying about +350 millivolts, and the polarity of backward diode 20 are defined such that current can flow into source 22, through winding 16 and tunnel diode 24, from ground. A reset diode 26, typically a Hughes type HD–5000 rectifier diode has the cathode thereof connected to the anode of tunnel diode 24. The anode of diode 26 is connected to source 28. Source 28 may be any conventional type of source which is capable of supplying periodic pulses similar to the clock pulse source 10. However, source 28 provides the pulses at different times than the pulses supplied by source 10 and is, thereby, effective to switch tunnel diode 24 into the high voltage operating condition, in the instant embodiment. Diodes 30 and 30$a$ are connected to the anode of tunnel diode 24. In a preferred embodiment, these diodes are General Electric CSD–2 type diodes which are special diodes and exhibit charge storage characteristics. Thus, a reverse current may be produced by back-biasing the diode after the prior application of a forward bias (and, thus a forward current) thereto. These diodes represent the M outputs which are obtainable from the circuit. The value of M is determined by the type of tunnel diode utilized, the tolerances required, the peak current value of the tunnel diode, etc. Diode 30 may also be considered as being one of the N input diodes (30 and 30*b*) which are used to couple independent stages together. Of course, input coupling diode 76 may be similar, in all respects, to diode 30.

The coupling diode, viz. diode 30, is so connected that current will flow from the preceding stage to the succeeding stage, for example stage A to stage B, in the instant application. Thus, the cathode of coupling diode 30 is connected to a first terminal of primary winding 38 of transformer T2. A second terminal of winding 38 is connected to potential source 32. Potential source 32 is similar to potential source 10 with the exception that these sources supply their pulses at different times. In fact, potential source may represent a delayed output obtainable from source 10. The secondary winding 40 of the transformer T2 has a first terminal thereof connected, via resistor 36 (1000–1500 ohms), to source 34. In addition, a backward diode 42 (similar to backward diode 20) is connected between the aforementioned first terminal of winding 40 and source 64 (similar to source 22). A second terminal of winding 40 is connected to the anode of tunnel diode 44, the cathode of which is connected to ground. Tunnel diode 44 is preferably similar, though not necessarily identical, to tunnel diode 24. Also connected to the anode of tunnel diode 44 is the cathode of diode 46 (similar to reset diode 26). The anode of diode 46 is connected to source 66, which is similar to previously discussed source 28. The M outputs derived from the circuit are represented by diodes 48 and 48*a*. These diodes are the coupling diodes between consecutive stages, similar to diode 30 previously discussed.

The coupling diodes 48 and 48*b* represents the N inputs of the circuit encircled by the dashed line C. The cathodes of the coupling diodes are connected to a first terminal of primary winding 50 of transformer T3. Another terminal of winding 50 is connected to source 68 which is similar to previously mentioned sources 10 and 32 with the exception that source 68 may be adapted to provide the clock signal at a time different from both of the aforementioned sources 10 and 32. The secondary winding 52 of transformer T3 has a first terminal thereof connected via resistor 54 (1000–1500 ohms) to potential source 34. The first terminal of winding 52 is also connected to source 70 via backward diode 56. Source 70 may be similar to the previously noted sources 22 and 64. A second terminal of winding 52 is connected to the anode of tunnel diode 58 which has the cathode thereof connected to ground. The anode of tunnel diode 58 is connected to the cathode of reset diode 60 which has the anode thereof connected to source 72 which corresponds to sources 28 and 66. The M outputs derivable from the circuit are represented by diodes 62 and 62*a*. These diodes may be connected to any type of desired output device represented by output terminals 72.

It is to be understood that the suggested components and component values, where not critical, are subject to variations. Furthermore, variations are contemplated in the types of components which are utilized. These variations are meant to be included within the description so long as the inventive principles are followed.

Figure 2:
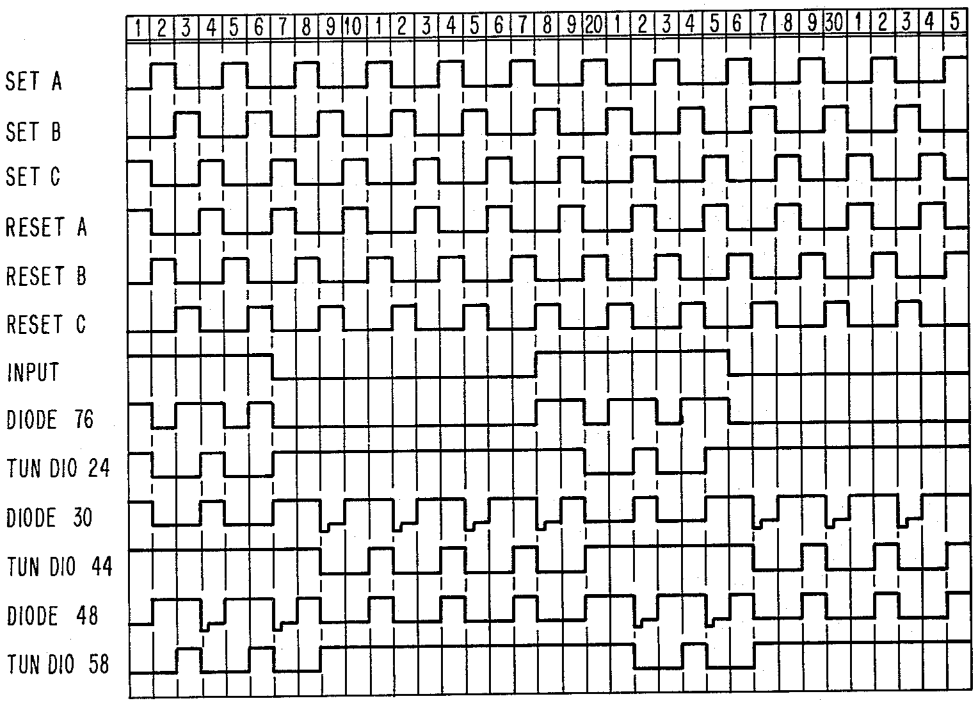
FIGURE 2 is a timing diagram for the circuit.

The operation of the circuit may be more readily understood when described in conjunction with the timing diagram shown in FIGURE 2. More specifically, the timing diagram is representative of the operation of the system of circuits as well as the individual circuits. There are shown three trains of set signals. These signals may be considered as a three-phase clock-signal utilized to sense the conditions of the circuits. Similarly, there are shown three trains of reset signals. Again these signals may be considered as a three-phase clock signal utilized to reset the tunnel diodes of the circuits. It is to be understood that the circuit operation is not limited to the three-phase set and reset clock signal set-up shown. Rather, this set-up is provided as a readily understood embodiment where each stage shown, viz., stages A, B and C, has a separate set-clock signal and a separate reset-clock signal without overlap problems. In addition, the instant embodiment permits the stages to be set and reset at different times (as required) but, also, permits adjacent stages to set and reset in proper sequence to assure the propagation of information from stage to stage without erroneous or spurious shifts.

The input signal levels are arbitrarily assigned. This signal is not meant to suggest any limitation on the circuit operation. The input signal is shown as a level type signal but, if properly synchronized, it could be a pulse type signal and function similarly, relative to the overall circuit. Moreover, the circuit would function and react to either type signal with similar results.

The signals relating to the diodes and the tunnel diodes are defined as being high level signals when there is current flow therethrough or a substantial potential thereacross. In other words, a forward biased diode and a tunnel diode in the valley-state (high potential state), have this condition represented by a high level signal. A low level signal represents a relatively reverse-biased diode and a peak-state (low potential state) tunnel diode.

Now referring concurrently to FIGURES 1 and 2, it will be seen that at time period T1, a high level signal is applied to input terminal 12. The high level signal has a potential of about +400 millivolts. This potential is applied to the anode of input coupling diode 76. The cathode of diode 76 is connected to source 10 via winding 14. Inasmuch as source 10 provides a low level signal at time period T1, diode 76 is forward biased (represented by a high level signal, as defined supra). The current flow through diode 76 continues through winding 14 to source 10 which functions as a sink in this case. Moreover, at time period T1, a reset A signal is applied by source 28. Since tunnel diode 24 is biased in the bistable mode by source 34 and resistor 18, it may be shifted to either of its stable operating conditions. The positive (with respect to ground) potential reset signal is applied to the anode of tunnel diode 24 via reset diode 26. Consequently tunnel diode 24 is in the high voltage or valley-state at time period T1. Carrying this description one step further, it will be seen that source 32 provides a low level signal at time period T1 whereby coupling diode 30 is forward biased by the high potential produced at the anode of tunnel diode 24. This operation will be further considered subsequently.

At time period T2, the input signal provided at terminal 12 remains a high level signal thereby tending to continue the current flow which was set up through winding 14. However, source 10 provides a high-level set A signal at this time. This high level signal is applied at one terminal of winding 14. The precise operation of this signal may be considered alternatively. That is, it may be considered either that the diode 76 is effectively reverse-biased, thereby stopping the previously produced current flow through the diode and, therefore, through winding 14 or that the signal merely cancels the current flow in the winding because of lack of potential difference thereacross. Of course, these alternatives are not completely independent phenomena and, furthermore, they each have the same result, viz. the stoppage of current flow through winding 14. For convenience, the former operation is considered and may, in fact, be supported by valid reasoning. However, the important feature is the current stoppage, such that, according to Lenz's law, the magnetic field previously developed around the winding will collapse and produce an oppositely directed current in an inductively coupled winding if there is a complete circuit loop. That is, the collapsing magnetic field induces a potential across the inductively coupled winding which produces current in a closed loop path.

Thus, the high level signal at source 10 effectively reverse-biases diode 76 such that current flow through winding 14 is abruptly halted whereby current will be produced in inductively coupled winding 16 by the changing flux produced by the collapsing magnetic field around transformer T1. In the embodiment shown, diode 76 may be a charge-storage diode. In this case, the high level signal produced by source 10, if large enough in magnitude, will actually produce a reverse current through winding 14 and diode 76. Though not required, this operation has the advantages of (1) producing a more sharply defined reverse current in winding 16 and, (2) producing a larger reverse current. The sharper definition of current is due to the precise reversal of current through winding 14 and the consequent flux change. The larger magnitude of current is due to the fact that the reverse current is produced by the flux change created by the current stoppage and, also, by the additional current available due to the reverse current produced through diode 76. As noted supra, this requirement is not essential to the circuit operation but it does provide improved operating characteristics.

Returning to the timing diagram of FIGURE 2, it will be seen that diode 76 has no current flow therethrough at time period T2. Thus, the current flow through winding 14 is interrupted and the resultant changing magnetic flux creates a current in winding 16. This current is so directed, because of the configuration of the transformer T1, that it effectively flows out of tunnel diode 24. As noted supra, source 34 and resistor 18 comprise a source capable of producing a substantially constant current. Therefore, backward diode 20 is connected to source 22 whereby a low impedance path is provided to a current sink. Consequently, the current or potential difference produced at winding 16 will be effective to shift tunnel diode 24 along its characteristic curve and load line into the low-voltage or peak operating condition. Thus, the potential at the anode of tunnel diode 24 (the output point) assumes a low level. Moreover, since tunnel diode 24 operates in the bistable mode, it remains in the low voltage state until reset to the high voltage state by the reset A signal at time period T4. This operation shows the NOR logic operation of the circuit inasmuch as no output signal was produced in response to an input signal.

At time period T3, the input remains high but the set A signal goes low. Therefore, a current flow is again setup through diode 76 and winding 14. The initial resurgence of current tends to produce a changing magnetic flux at transformer T1. This flux change is such that it induces a potential difference across winding 16. The potential difference is so poled that it tends to produce a current which flows into the tunnel diode. However, the constant current source, source 34 and resistor 18, cannot supply or accept significant additional current. Moreover, backward diode 20 is now effectively reverse biased thereby exhibiting high impedance characteristics relative to source 22 and cannot function as a current path. Therefore, since a complete circuit capable of supplying current is unavailable, tunnel diode 24 does not switch its operating state when the set A signal is removed in the presence of a high level input signal.

At time period T4, source 28 supplies a reset A signal which drives tunnel diode 24 into its high-voltage operating condition. This is accomplished due to the fact that reset A signal effectively raises the potential at the anode of tunnel diode 24 to a sufficiently high potential. This potential at the anode of tunnel diode 24 does not affect the input to stage A inasmuch as the current supplied to winding 16 remains substantially constant due to the aforementioned constant current source and the sink comprising backward diode 20 and source 22. Similarly, the raised potential at the anode of tunnel diode 24 does not affect the operation stage B at this time inasmuch as tunnel diode 44 (of stage B) will be reset by the reset B signal prior to the setting of stage B by the set B signal. More generally, any current which might pass through diode 30 and winding 38 to source 32 would be in the direction opposite to the current produced by a set B signal. This condition was described supra in terms of a resurgence current.

At time period T5 the operation of the circuit is identical to the operation described regarding time period T2. Similarly, the circuit operation for time period T6 is identical to the circuit operation at time period T3. At time period T7, it will be seen that the input signal shifts to a low level signal. The input signal remains a low level signal until time period T18. When the input signal shifts to the low level at time period T7 the diode 76 effectively follows. That is, inasmuch as the potential at the anode of the diode 76 shifts to the level which is substantially similar to the base signal level produced by source 10, the potential difference exhibited across diode 76 is effectively 0 volts at all times. Inasmuch as the anode is effectively clamped to a low level potential by the input signal applied at terminal 12, diode 76 will not pass current until time period T18 when the input signal switches to the high level. At time period T7, tunnel diode 24 is reset to the high voltage operating condition by the reset A signal. Inasmuch as diode 76 does not pass current whereby a steady state current flow is produced through winding 14, an interruption of this current is, of course, impossible whereby a current signal cannot be generated in winding 16 to alter the operation of tunnel diode 24. Consequently, tunnel diode 24 will remain in the high voltage operating condition until set at a later time, viz. time period T20. At time period T18, the input signal was defined as assuming the high level.

Since this latter input signal change did not take place coincidently with a set A signal, the diode 76 will effectively follow the input signal. That is, a current will be produced through the diode because of the potential difference thereacross. Similarly, a "steady-state" current will be produced in the winding 14. The same conditions will exist during time period T19 inasmuch as no set A signal occurs to alter the circuit operation. The application of the rest A signal at time period T19 is ineffective to create any change inasmuch as the tunnel diode 24 is in the high voltage operating condition.

At time period T20, the circuit operation is identical to that described supra at time period T2 or time period T5. Similar circuit operation occurs at time period T23. That is, the application of the set A signal reverse biases diode 76 thereby interrupting the current flow through winding 14 such that the change of flux created thereby produces a current signal in winding 16. This current signal causes tunnel diode 24 to be switched to the low voltage operating condition. When the set A signal is removed as, for example, at time periods T21, 22, 24 and 25, the diode 76 passes current therethrough because of the high level input signal. The current flow through diode 76 again creates the current signal in winding 14 which is required for switching of tunnel diode 24. At time periods T22 and T25, the reset A signal causes tunnel diode 24 to be reset to the high voltage operating condition. Thus, the circuit operation is as shown in FIGURE 2. At time period T26, the input signal switches to the low level and remains there for the remainder of the instant description. As noted supra, diode 76 will effectively follow the input whereby no current is produced therethrough so long as the input signal remains low. Therefore, diode 76 remains effectively reverse biased throughout the remainder of the circuit description. Since current signals are not applied to winding 14, the signals cannot be induced into winding 16 by the application of a set A signal. Consequently, tunnel diode 24 will remain in the high voltage operating state through the remainder of the circuit description. It should be noted that at time period T26 the input signal was already low whereby diode 76 was already cut off when the set A signal was applied. Consequently, this set A signal, as is the case of others where no input signal is applied, will not switch tunnel diode 24. It should be understood, of course, that this type of operation assumes ideal components, especially diodes which are turned ON and turned OFF substantially instantaneously in accordance with the potentials applied thereto. In the event that the components are not capable of such operation, certain delays should be built into the circuit or otherwise provided. These delays will prevent any undesirable overlapping of adjacent signals.

Another advantage of the circuit may be utilized. That is, the delay encountered due to the charge storage diodes, for example, diode 30*a*, may provide an asynchronous (or synchronous) output for the circuit. Considering the case of diode 30*a*, the cathode thereof is connected to one terminal of another transformer primary winding (not shown) similar to winding 38. Diode 30*a* will have a certain signal condition at the anode thereof in accordance with the operating condition of tunnel diode 24. This signal condition can be determined or detected by the application of a sensing signal to another terminal of the winding (not shown). This detection of the condition of tunnel diode 24 is achieved because of the charge storing nature of diode 30*a* in a similar manner to the signal detection via diode 30. Specifically, if the signal at the anode of diode 30*a* is a low level signal, the sensing signal applied via the winding connected thereto will not produce an output signal because the diode is reverse biased. On the other hand however, if the signal condition at the anode of diode 30*a* is a high level signal, an output signal will be produced by the application of the sensing signal. That is, the provision of a high level signal at the anode of diode 30*a* produces a forward current therethrough such that charge is stored in the lattice of the diode. Assuming negligible leakage current (which condition can be imposed), the diode will remain in the charged state for some determinable time period. The subsequent application of the sensing signal will produce an output signal inasmuch as a complete current path is available because of the availability of a reverse current through diode 30*a*. Of course, proper circuit design will enable the charge storage or memory time of the diode 30*a* network to be controlled and defined whereby selective sampling of the condition of tunnel diode 24 may be accomplished asynchronously, if so desired. Of course, this circuit advantage or operating principle may be incorporated into each of the other circuits shown in FIGURE 1.

Referring now to stage B of FIGURE 1, the cognizant components are diode 30 and tunnel diode 44. Diode 30, will in effect, follow the output signal of stage A where the output signal is derived from the anode of tunnel diode 24. Thus, at time period T1, diode 30 has the high level potential applied to the anode thereof and a low level potential supplied to the cathode thereof. The high level potential is supplied by tunnel diode 24 and the low level potential is supplied by source 32 via winding 38. Because of the potential differences thereacross, diode 30 is capable of conducting current in the forward direction (as is represented by a high level signal in FIGURE 2). The current flow through diode 30 passes through winding 38 of transformer T2 to source 32. Tunnel diode 44, at time period T1 is assumed to be in the high level condition in view of the application of a prior reset B signal.

At time period T2, the tunnel diode 24 will switch to the low voltage operating condition. Thus, a low level potential is applied to the anode of diode 30. Consequently, diode 30 is effectively reverse biased and current does not pass therethrough. This switching of diode 30 has the effect of cutting off the current flow through winding 38. This current interruption is not effective to alter the condition of tunnel diode 44 especially inasmuch as the reset B signal occurs at this time. Thus, though the transformer current may tend to switch the tunnel diode, the reset signal supplied by source 66 will override the effect of the switching signal. Similar operation takes place at time periods T4 and T5. At time period T6, (similar to time period T3), diode 30 is effectively reverse biased because of the low voltage applied to the anode thereof by tunnel diode 24 such that the application of the set B signal cannot create a switching current in winding 40 whereby tunnel diode 44 remains in the high voltage operating condition.

At time period T7, diode 30 conducts current inasmuch as the output signal from tunnel diode 24 becomes a high level signal. The conduction of diode 30 again institutes a steady-state current through winding 38. This steady-state current tends to continue until the switching of tunnel diode 24 at time period T20. However, the set B signals applied by source 32 are of sufficient magnitude to reverse bias diode 30 thereby interrupting the current flow through diode 30. In fact, if diode 30 is a charge storage diode, a reverse current may pass through winding 38 and diode 30 during the time when the stored charge is cleaned up. This reverse current is suggested by the additional step shown on the waveform of diode 30. The set B signals which reverse bias diode 30 cause an interruption of the current flow through winding 38. As in the case of transformer T1, the interruption of the flow of current in winding 38 of transformer T2 causes a collapsing of the magnetic field around this winding such that a magnetic flux change takes place at winding 40 thereby producing a current at this winding. This current again is so directed because of the configuration of the transformer, that current is drawn from the tunnel diode 44 to source 64 via the low impedance path of backward diode 42. Therefore, at time periods T9, T12, T15 and T18, tunnel diode 44 is switched to the low voltage operating condition. Of course, with the removal of the set B signal supplied by source 32, the current flow through diode 30 is reinstated as shown in the diagram. Also, as shown in the diagram, the tunnel diode 44 is reset to the high voltage operating condition at time periods T11, T14, T17 and T20. The operation of the circuit from time period T20 through time period T26 is similar to the operation previously described when the tunnel diode 24 was in the low voltage operating condition and producing a low level output signal. The circuit operation from time period T27 is identical to the previously described circuit operation when the tunnel diode 24 is in the high voltage operating condition and producing a high level output signal. Thus it will be seen that when tunnel diode 24 is in the low voltage operating condition which is representative of a low level signal, tunnel diode 44 is, generally, in the high voltage operating condition. Conversely, when tunnel diode 24 is in the high voltage operating condition which is representative of a high level input signal, tunnel diode 44 is, generally, in the low level operating condition. Therefore, it should be obvious that the NOR logic function is produced by stage B of the circuit.

Moving now to stage C, the pertinent switching elements are diode 48 and tunnel diode 58. During time periods T1 through T8, tunnel diode 44 is in the high voltage operating condition whereby a high level input signal is supplied to diode 48. Consequently, diode 48 normally tends to be conductive and to permit a steady-state current flow through winding 50 of transformer T3. However, the set C signals are applied at time periods T1, T4 and T7. These signals tend to reverse bias diode 48 and thereby interrupt the current flow therethrough. As described supra, the reverse bias of diode 48 interrupts the current flow through winding 50 whereby a current is induced into winding 52 by the collapsing magnetic field around transformer T3. The induced current flows from ground, through tunnel diode 58, through backward diode 56 (which is forward biased or a relatively low impedance) to source 70. Thus tunnel diode 58 is switched to the low voltage operating condition by the creation of a current signal in winding 52 at time periods T1, T4 and T7. The tunnel diode is reset to the high voltage operating condition at time periods T3 and T6 by the reset C signal. At time period T9 tunnel diode 44 is switched to the low voltage operating condition whereby a low level signal is produced. Thus diode 48 is reverse biased because of the low level signal applied to the anode thereof. Also at time period T9, the reset C signal causes tunnel diode 58 to be reset to the high voltage operating condition. Diode 48 tends to follow the input signals applied by tunnel diode 44 inasmuch as this signal is applied to the anode thereof. Consequently, even though diode 48 is conducting at time periods T11, T14 and T17, this conduction does not produce a current flow through winding 50 coincidentally with the application of a set C signal. Therefore, there is no change manifested in the winding 52 of transformer T3 whereby a change would be made in tunnel diode 58. Thus, tunnel diode 58 remains in the high voltage operating condition from time period T9 to time period T21. At time period T20, the tunnel diode 44 is switched to the high voltage operating condition. As noted supra, diode 48 tends to follow this signal and to be conductive; however, at time periods T22 and T25, set C signals are applied by source 68 thereby reverse biasing diode 48 and interrupting the current flow through winding 50. A current signal is created in winding 52 by the collapsing magnetic field around transformer T3 such that current flows through tunnel diode 58, backward diode 56, to source 70. Thus, tunnel diode 58 is switched to the low voltage operating condition at time periods T22 and T25. At time periods T24 and T27, the reset C signals are applied by source 72 via diode 60 such that tunnel diode 58 is switched back to the high voltage operating condition. The operation of the circuit from time period T27 on is similar to the circuit operation from time period T9 to time period T19. That is, the diode 48 is not conductive concurrently with the application of a set C signal. Consequently, tunnel diode 58 remains in the high voltage operating condition whereby a high level output signal is produced again. It will be seen that tunnel diode 44 and tunnel diode 58 are in the opposite operating conditions throughout whereby the NOR logic function is produced by the circuit.

It will be seen that the operation of the circuit or circuit portions, shown as stages A, B or C and enclosed in the associated dashed outline, all follow the same operating principle. Furthermore, each of these circuits performs a NOR logic function. The description given is in terms of a plurality of NOR logic circuits cascaded to form a type of shift circuit or register. Obviously, this is not meant to be limitative of the circuit operation but rather each of the individual circuits or stages may be considered to be independent. Moreover, on the other hand, further circuits may be cascaded to those shown in order to form a system having any number of stages or circuits.

The components and component values shown and suggested are not meant to be limitative of the invention. Modifications in the various elements and components may be made so long as the inventive concepts included in any of these modifications fall within the scope of this description. Modifications which may be readily considered are that the coupling diode need not be charge storage diodes but rather could be any type of typical or conventional rectifier diode. On the other hand, other diodes in the circuit may be replaced by charge storage diodes. Similarly, the dual or reverse of the instant circuit is contemplated within the scope of this description; that is, a change of polarity of the switching elements and the applied signals may be desirable in some applications and this is suggested here. The principle of operation is identical but does not require further consideration.

The embodiments of the invention in which an exclusive property or privilege is claimed are defined as follows:

1. A NOR logic circuit comprising, switchable input means for supplying input signals, a transformer having first and second windings, first source means selectively supplying control signals, said control signals having opposite sense and at least equal magnitude relative to said input signals, said first winding connected between said input means and said first source means, such that steady state current produced therethrough by said input means may be interrupted by a control signal so as to product a signal in said second winding, a tunnel diode, bias source means connected to said tunnel diode via said second winding, said bias source operable to bias said tunnel diode in the bistable operating mode, and a variable impedance path connected to said tunnel diode to provide different currents to said tunnel diode when said tunnel diode changes from one stable operating state to the other stable operating state in response to a signal being produced in said second winding by a conrol signal supplied to said first winding.

2. A logic circuit comprising, input signal supplying means, a transformer having first and second windings, first source means for selectively supplying control signals, first diode means, said first winding connected to said input means via said first diode means and to said first source means such that the application of a control signal reverse biases said first diode means and interrupts the current produced in said first winding by said input means, tunnel diode means, bias source means, said second winding connected to said tunnel diode means and to said bias source mean, said second winding being inductively coupled to said first winding such that signals in said first winding may shift the operating condition of said tunnel diode mean, second source means for selectively supplying signals for resetting said bistable device, third source means, and second diode means connecting said third source means to said second winding.

3. In combination, input means for supplying input signals, said input signals having a predetermined sense and magnitude, diode means, a transformer having first and second inductively coupled windings, said diode means connected in series with said first winding, first source means for selectively supplying first control signals, said first control signals having opposite sense and at least equal magnitude relative to said input signals, said first winding and said diode means connected between said input means and said first source means such that a current produced through said first winding by said input signal supplying means may be selectively interrupted by a first control signal which reverse biases said diode means whereby a changing magnetic field is produced at said transformer thereby inducing a signal in said second winding, a tunnel diode, bias source means connected to said tunnel diode via said second winding, said bias source means operable to bias said tunnel diode in the bistable operating mode such that the operating condition of said tunnel diode may be changed in response to a signal produced in said second winding by said changing field produced at said transformer, second source means for selectively supplying second control signals, said second source means connected to said tunnel diode for selectively supplying thereto said second control signals which have the magnitude and polarity to change the operating condition of said tunnel diode oppositely to the change produced in response to a signal produced in said second winding, current sink means, and diode means connected between said current sink means and said tunnel diode such that a low impedance current path is provided when the operating condition of said tunnel diode is changed by a signal in said second winding.

4. In combination, input signal supplying means, unilateral conducting means, a transformer having first and second windings, first source means for selectively supplying control signals, said first winding connected in series with said input means via said unilateral conducting means and said first source means such that the current produced in said first winding by said input means is interrupted by the application of a control signal which disables said unilateral conducting means, a tunnel diode which is initially in one stable operating condition, bias source means for biasing said tunnel diode for bistable operation, said second winding connected in series with said tunnel diode and said bias source means, said second winding being inductively coupled to said first winding such that signals produced in said first winding by disabling said unilateral means induce a signal in said second winding which induced signal will shift the operating condition of said tunnel diode to another stable operating condition, and second source means selectively supplying signals capable of resetting said tunnel diode to said one stable operating condition.

5. The combination recited in claim 4, including current sink means, and diode means connected in series with said current sink means and said second winding such that a low impedance current path through said diode means exists only when said tunnel diode shifts from said one stable operating condition to said another stable operating condition in response to a signal produced in said second winding.

References Cited by the Examiner

UNITED STATES PATENTS

| | | | |
|---|---|---|---|
| 2,966,599 | 12/1960 | Haas | 307—88.5 |
| 3,054,002 | 9/1962 | Tendick | 307—88.5 |
| 3,071,700 | 1/1963 | Smith | 307—88.5 |

OTHER REFERENCES

Pub. I, International Solid State Ckts., Conf. Digest of Tech Papers, "Appln. of Tunnel Diode," pages 10 and 11. Feb. 10, 1960.

ARTHUR GAUSS, *Primary Examiner.*